(12) United States Patent
Lee et al.

(10) Patent No.: US 6,913,716 B2
(45) Date of Patent: Jul. 5, 2005

(54) METHOD FOR MANUFACTURING HOMOGENEOUS GREEN BODIES FROM THE POWDERS OF MULTIMODAL PARTICLE SIZE DISTRIBUTION USING CENTRIFUGAL CASTING

(75) Inventors: Hae-Weon Lee, Seoul (KR); Huesup Song, Seoul (KR); Jongho Lee, Seoul (KR); Joosun Kim, Daejeon (KR); Hyunick Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 353 days.

(21) Appl. No.: 10/213,454

(22) Filed: Aug. 5, 2002

(65) Prior Publication Data

US 2003/0030163 A1 Feb. 13, 2003

(30) Foreign Application Priority Data

Aug. 8, 2001 (KR) .......................................... 2001-47604

(51) Int. Cl.$^7$ ............................ B29B 9/08; B29C 39/02; B29C 35/02
(52) U.S. Cl. .......................... 264/13; 264/29.3; 264/636; 264/682; 264/311
(58) Field of Search ......................... 264/13, 29.1, 29.3, 264/115, 311, 636, 682

(56) References Cited

U.S. PATENT DOCUMENTS

| | | | | |
|---|---|---|---|---|
| 4,526,734 A | * | 7/1985 | Enomoto ....................... 264/13 |
| 5,628,945 A | * | 5/1997 | Riman et al. ................ 264/117 |
| 6,723,387 B1 | * | 4/2004 | Kear et al. ................... 427/450 |

* cited by examiner

Primary Examiner—Mary Lynn Theisen
(74) Attorney, Agent, or Firm—Jones Day

(57) ABSTRACT

Disclosed is a method for manufacturing composite granules having a homogeneous particle distribution, comprising powders of multimodal particle size distribution and phenol resins, and a method for manufacturing green bodies having homogeneous microstructure without particle separation from the granules.

10 Claims, 5 Drawing Sheets

METHOD FOR MANUFACTURING HOMOGENEOUS GREEN BODIES FROM THE POWDERS OF MULTIMODAL PARTICLE SIZE DISTRIBUTION USING CENTRIFUGAL CASTING

FIELD OF THE INVENTION

The present invention relates to a method for manufacturing composite granules having homogeneous particle distribution, comprising powders of multimodal particle size distribution and phenol resins, and a method for manufacturing green bodies having homogeneous microstructure without particle segregation (separation from the granules).

BACKGROUND OF THE INVENTION

This invention intends to overcome a limitation of the wet process, which is commonly used to manufacture the ceramics parts of shape complexity. Such limitation arises when raw material powders have a wide range of particle sizes and density distribution for intended use of ceramics parts, which tend to promote particle separation in the wet process.

In general, using fine powders can improve the sinterability of ceramics parts. However, when these parts need to be used in a high temperature environment (e.g. sintering jig, reaction tube etc.), dispersed particles of coarse size are used instead in order to improve their creep resistance and thermal shock resistance. To achieve a high molding density using the powder of coarse size, pores among coarse particles are filled by intermediate size particles. Subsequently, smaller particles are then used to fill smaller pores formed by these intermediate size particles.

The critical factor to minimize pore volume and increase overall packing density is to maintain packing uniformity without segregation between component particles using the powders of multimodal particle size distribution.

As recent demands have increased for manufacturing large size ceramics parts in real form and improving their physical properties, use of the wet process such as slip casting, gel-casting and injection molding has increased gradually. However, the wet process is rarely used for molding powders of multimodal particle size distribution. This is because their sedimentation velocities vary greatly depending on different particle size and density under atmospheric gravity.

Generally, the larger the particle size ratio in constitutional particles, the higher the packing density by multimodal particle size distribution. However, it is reported that the best packing density can be achieved at the 7:1 size ratio and no appreciable benefit is gained by increasing the ratio any further (Particle Packing Characteristics, R. M. German, pp. 147, Metal Powder Industries Federation, New Jersey).

When the size ratio of constitutional particles is 7:1, their sedimentation velocity ratio becomes 49:1 according to Stokes law. Therefore, the particles tend to separate as illustrated in FIG. 1. To prevent such undesirable effects by maximizing the volumetric fraction of powders in the slurry, a significant improvement in packing homogeneity can be achieved by a restricted sedimentation as shown in FIG. 2 (G. A. Steinlage, R. K. Roeder, K. P. Trumble, and K. J. Bowman, "Centrifugal Slip Casting of Components," Am. Ceram. Soc. Bull., 75(5): 92–94, 1996).

However, when trying to manufacture green bodies with high packing density using mixed powders of multimodal particle size distribution, it is very difficult to completely overcome particle separation in the wet process (e.g. centrifugal casting) as the liquid medium is not removed. This makes manufacture of homogeneous green bodies difficult.

SUMMARY OF THE INVENTION

The objective of this invention is to provide homogeneous green bodies having uniform microstructure without particle separation by using mixed powders of multimodal particle size distribution.

The present invention provides a method for manufacturing composite granules having a homogeneous particle distribution, comprising powders of multimodal particle size distribution and phenol resins, and a method for manufacturing green bodies having homogeneous microstructure without particle separation in green bodies.

Specifically, the method for manufacturing composite granules having a homogeneous particle distribution by using powders of multimodal particle size distribution comprises the steps of:
(1) making a homogeneous mixture including powders of multimodal particle size distribution, phenol resin and alcohol;
(2) dropping said mixture in water or water including hardener and agitating it to form homogeneous granules;
(3) separating the granules from the mixture in step (2) by filtration or precipitation, then washing with water to remove residual alcohol; and
(4) drying to remove any liquid medium present in the granules separated in step (3).

Another embodiment is a method for making green bodies having a homogeneous packing structure without particle separation, comprising the steps of: charging the prepared granules to a mold and adding water, alcohol or water/alcohol mixed solvent of about 20 to 100% by volume of pores formed by the granules; and heating the mixture in the mold while applying centrifugal force of 2 to 100 times gravitational acceleration.

DETAILED DESCRIPTION OF THE PREFERRED EMBODIMENTS

The present invention is based on studies to accomplish the above-noted objectives which found that green bodies having a homogeneous packing structure without particles separation, for example, in the shape of a tube, can be manufactured by using the method comprising the following steps. Dropping a slurry of powders of multimodal size distribution and phenol resins into non-solvent water, thereby preparing granules, and subsequently, centrifugal casting the granules with a solvent which dissolves the granules such as water, alcohol or a mixture solvent of alcohol and water.

The present invention provides a method for manufacturing composite granules having a homogeneous particle distribution, comprising powders of multimodal particle size distribution and phenol resins, and a method for manufacturing green bodies having homogeneous microstructure without particle separation from the granules.

This invention introduces a new process in the field of structural ceramics, whereas prior technologies, in general, rely on a mechanical method (e.g. pelletizing) to obtain granules, which are to used in CIP (Cold Isostatic Pressing) and molding a product or plastic body processing to make a product such as a tube.

This invention provides a centrifugal casting method of a completely new approach, which overcomes the sedimentation velocity difference arising from the size or density differences in powders of multimodal particle size distribution, when tube-like parts, such as a reaction tube, are manufactured by wet process using the powders.

For centrifugal casting with use of restricted sedimentation or aggregation-dispersed-system, a very great variance in particle size and increase of thickness in the molding product, make it difficult to prevent separation of the particles. However, the casting method of the present invention casts centrifugally composite granules containing powders of multimodal particle size distribution and thermosetting phenol resins in the presence of a solvent with a limited capacity, to dissolve phenol or within the range of temperature to maintain such capacity. Overall, such centrifugal casting is completely free of particles separation.

To prevent particle separation according to the invention, first, slurry is made by dispersing raw material powders in an alcohol solution of phenol resin. Next, the slurry is dropped in water to obtain granules and maintaining the mixed state. As phenol present in the granules is not miscible with the water and rather, dissolves in the alcohol phase, the alcohol is eluted from the granules and becomes displaced by water while maintaining the original degree of mixing.

Figure 1:
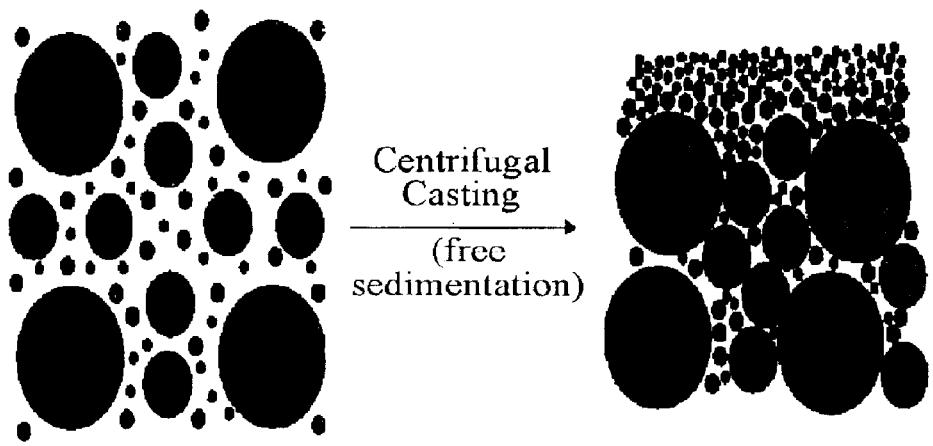
FIG. 1 is a diagram depicting particle separation generated in general centrifugal casting.
Figure 2:
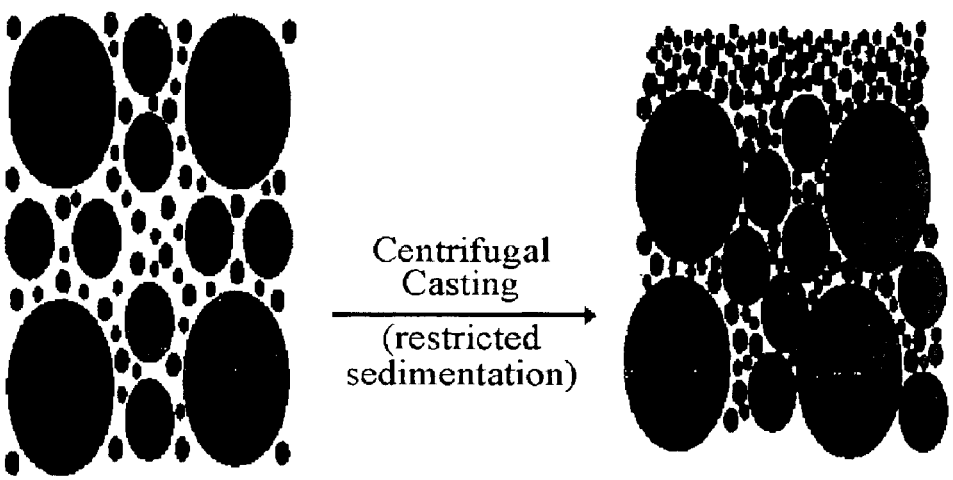
FIG. 2 is a diagram depicting restricted sedimentation used to prevent particle separation.
Figure 3:
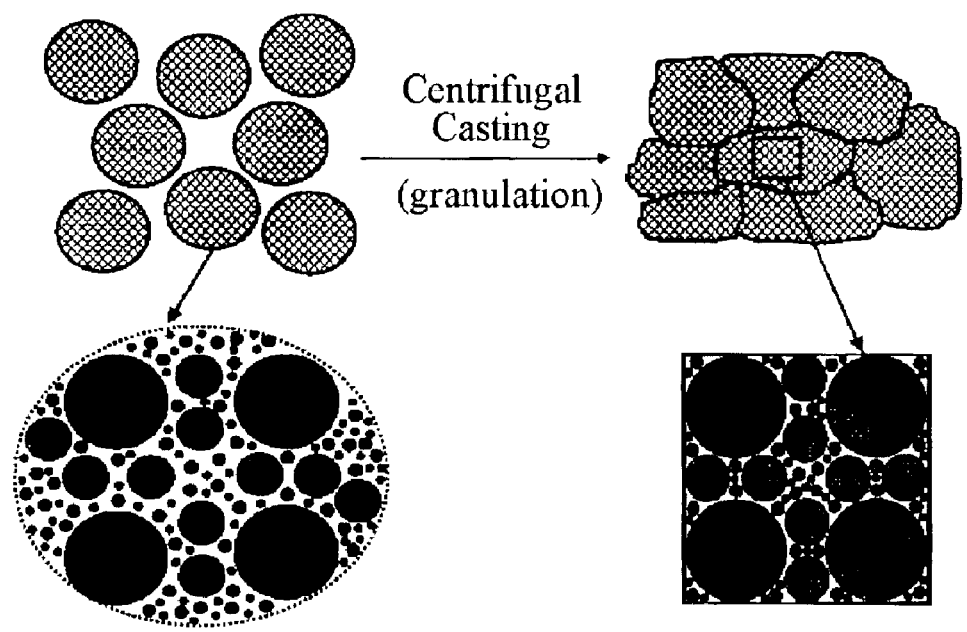
FIG. 3 is a schematic diagram showing a granule packing method to prevent particle separation according to the present invention.

Green bodies having a high packing density without separation of constitutional particles can be obtained in the following way. First, a small amount of water, alcohol or a mixed solvent of alcohol and water (all of which can partially dissolve phenol contained in the granules) is added to the granules. Next, the prepared granules are charged and heated in a mold. Finally, the mold is spun. Overall, the centrifugal force and the heat applied to the mold bring about structural changes in the granules so that green bodies having a high packing density without separation of the constitutional particles can be obtained. As illustrated in FIG. 3, the already hardened granules keeping the shape are affected by dissolution of phenol resins due to the pressure and temperature increase stemming from the centrifugal force and under certain conditions, the granules are extended perpendicular to the pressure and form green bodies. The powders of multimodal particle size in the granules move freely only within each granule; and therefore, particle separation is basically eliminated.

Therefore, the present invention provides a method for manufacturing composite granules having a homogeneous particle distribution, comprising powders of multimodal particle size distribution and phenol resins, and a method for manufacturing green bodies having homogeneous microstructure without particle separation from the granules.

As described above, the method for manufacturing composite granules having a homogeneous particle distribution by using powders of multimodal particle size distribution comprises the steps of:

(1) making a homogeneous mixture including powders of multimodal particle size distribution, phenol resin and alcohol;
(2) dropping said mixture in water or water including hardener and agitating it to form homogeneous granules;
(3) separating the granules from the mixture in step (2) by filtration or precipitation which are then washed with water to remove residual alcohol; and
(4) drying to remove any liquid medium present in the granules separated in step (3).

In addition, the method for manufacturing green bodies in this invention comprises the step of (5) centrifugal casting wherein first, the required amount of granules prepared according to the above steps are charged into a mold and about 20 to 100% of pores volume formed by the granules of water, alcohol or water/alcohol mixed solvent is added. Next, the mixture in the mold is heated to a temperature, preferably 40 to 110° C. while centrifugal force of 2 to 100 times gravitational acceleration is applied to induce rearrangement of the granules and the constitutional particles so that the pores in the granules are removed.

The method for manufacturing green bodies as above can also comprise the additional steps of (6) maintaining the prepared green bodies at 50 to 80° C. for 2 to 10 hours depending on the thickness of green bodies to completely harden the phenol resins; and (7) removing pockets in the green bodies prepared in step (6) in inert gas atmosphere or under vacuum, whereby residual carbon is left; or removing pockets in the green bodies in ambient air to eliminate residual carbon.

Specifically, in step (1), powders of appropriate particle size, for example silicon carbide or alumina powder are mixed with phenol resins of about 1 to 20% of the powder weight depending on the desired use. Then, after adding ethyl or butyl alcohol, the mixture is agitated vigorously to obtain a homogenous mixture. In step (2), the mixed slurry is dropped in water with or without hardener at 70 to 90° C. In order to speed up the process in which water displaces alcohol in the granules while maintaining the shape of granules, the mixture is vigorously agitated; thereafter, stable granules are prepared.

The formation of granules is more facilitated and the shape of granules becomes more stable as the fraction of water with respect to alcohol used in preparing the slurry increases. When a hardener is added to water, the formation of granules becomes even more facilitated.

Step (3) is the stage for separating granules. Once the formation of granules is complete, they can be separated by filtration or precipitation. It helps to prevent changes in the shape of granules or binding of granules during the drying process to rewash the separated granules with water thereby minimizing residual alcohol level. It is preferable to repeat this process, i.e. washing of the separated granules, agitation and filtration or precipitation about 2 to 3 times.

In step (4), the prepared granules are dried at either room temperature or a temperature below 70° C., to remove any remaining liquid medium.

Step (5) is for centrifugal casting using a solvent under centrifugal force to enhance the rearrangement of granules as well as packing of their constituent particles in the granules. First, the required amount of granules prepared as above is charged to a mold, and water, alcohol or water/alcohol mixed solvent of about 20 to 100% of pore volume in the granules is added. The mixture in the mold is subject to centrifugal casting by heating to a temperature between 40 and 110° C. for 0.5 to 2 hours under pressure not less than 2 times the gravitational acceleration so that homogeneous green bodies having maximum packing density without separation of the constitutional particles can be obtained.

If only water is used as a solvent, centrifugal casting is carried out with heating to induce rearrangement of the granules. In this case, it is preferable to apply acceleration by centrifugal force of above 10 times the gravitational acceleration while heating to a temperature of 80 to 110° C.

If alcohol or water/alcohol mixed solvent is used, because of partial dissolution of phenol resin in the temperature of 40 to 80° C. and change promotion of the granule shape thereby, it is possible to obtain uniform and compact casting at relatively low pressure by the centrifugal force of at lest twice the gravitational acceleration.

In step (6), the prepared green bodies are heated to 50 to 80° C. and maintained for 2 to 10 hours depending on the thickness of the green bodies to completely harden phenol resins and to remove residual solvent.

In step (7), organic components in the hardened green bodies are removed. According to the intended use, removing organics in inert gas atmosphere or under vacuum can make residual carbon remain and if the process is carried out in air, residual carbon is almost completely removed.

Therefore, when carbon is necessary as raw material as in reaction-bonded silicon carbide, phenol resins are thermally decomposed. After making the residual carbon compact as necessary, the bodies are reacted with molten silicon which would penetrate via capillaries between the particles to obtain reaction-bonded silicon carbide. In contrast, the process of removing pockets for an oxide (e.g. alumina) is carried out in air to remove its residual carbon, followed by high temperature sintering to obtain oxide parts of desired microstructure.

If the goal is to obtain residual carbon in inert gas atmosphere or under vacuum, it is preferable to increase the temperature to 1000 or 1300° C. so as to completely convert to carbon. If, instead, the process is carried out in ambient air to completely remove the residual carbon, it is preferable to maintain the green bodies at a temperature of 400 to 600° C. for 1 to 5 hours depending on the size of a part or the load in the reaction chamber after increasing the temperature at 0.5 or 3° C./minute because oxidization of carbon is an exothermic reaction.

Both processes as above provide a homogeneous particle distribution in the green bodies so that they can have an advantage of minimizing porosity or packing defect in the bodies due to uneven distribution of particles.

Especially, if Cold Isostatic Pressing is carried out to prevent particle separation when trying to make, for example, a large reaction or adiabatic vessel, the initial equipment investment cost and molding cost become very high and the most of production cost is incurred by a subsequent molding product processing. However, the present invention greatly reduces the initial investment cost and the processing cost because green bodies having a homogeneous packing structure can be made from powders of multimodal particle size distribution.

The present invention will now be described in detail with reference to the following examples, which are not intended to limit the scope of the invention.

EXAMPLE 1

When manufacturing silicon carbide/carbon green bodies for making reaction sintering silicon carbide, thermosetting resins such as phenol resin offer excellent characteristics of carbon as raw material by being thermally decomposed in the inert gas atmosphere or under vacuum.

Two hundred grams (200 g) of silicone carbide powders mixture (Japan Showa Denko, GC) were prepared by mixing the powders having the particle size of 150, 35 and 5 microns in weight ratio of 49:29:23 and were blended in the dry process for two hours with phenol resins (KNG 100, Kolon Chemical Co., Ltd., Republic of Korea) of 15 wt % of silicone carbide powders. Forty millimeters (40 ml) of 1-butylalcohol as solvent was added to the dry mixture and agitated at room temperature for 30 minutes until phenol resins were completely dissolved.

The mixed slurry was dropped in an aqueous solution of hexamethyleneamine at 85° C. and agitated vigorously for 10 minutes. This mixture is cooled down to room temperature, and then washing with water and filtration were repeated three times. The filtered granules were dried at 70° C. to be used for centrifugal casting.

One hundred and fifty grams (150 g) of the prepared granules were charged to an aluminum mold (inner diameter: 65 mm) and 70 ml of water was added. While heating this to 80° C., the centrifugal casting was carried out at 1,500 rpm for 1 hour to make green body having a homogeneous packing structure without substantial particle separation.

Figure 4:
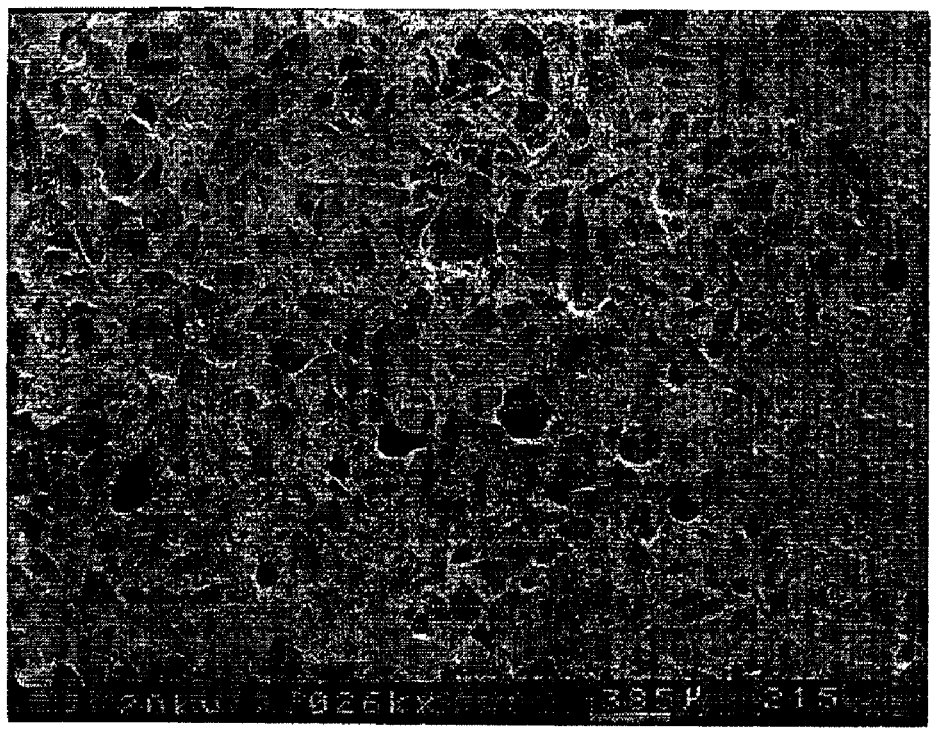
FIG. 4 is Scanning Electron Microscope (SEM) photograph which shows a microstructure having a homogeneous packing structure of a green body prepared in Example 1.

Subsequently, the prepared green bodies were dried and hardened at 80° C. for 10 hours, and then heat-treated at 1200° C. for 1 hour under vacuum to make homogeneous carbonized body of silicon carbide/carbon without a significant particle separation, ultimately for making reaction-bonded silicon carbide. As illustrated in FIG. 4, the green bodies prepared in this example displayed the microstructures having homogeneous packing structure.

As in the generally known manufacturing process for making reaction-bonded silicon carbide, silicon powders were placed on the prepared carbonized body, and then at temperature above 1410° C., the melting point of silicon, residual carbon would react with molten silicon that has penetrated through capillaries between the particles. In this way, it is possible to obtain reaction-bonded silicon carbide parts.

EXAMPLE 2

One hundred and fifty grams (150 g) of the granules prepared in the same way as Example 1 were charged to an aluminum mold (inner diameter: 65 mm) and 20 ml of ethanol was added. While heating this to 40° C., the centrifugal casting was carried out at 1,500 rpm for 1 hour to make green body having a homogeneous packing structure without substantial particle separation.

Figure 5:
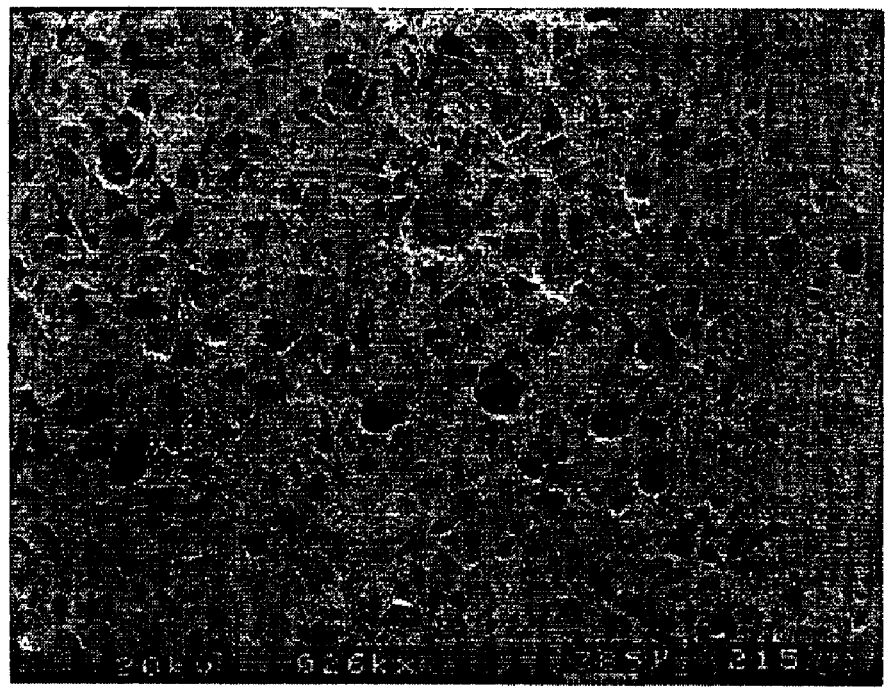
FIG. 5 is an SEM photograph showing a microstructure having a homogeneous packing structure of a green body prepared in Example 2.

Subsequently, the identical process as in Example 1 was utilized to produce the carbonized body. As illustrated in FIG. 5, the carbonized green bodies prepared in this example displayed the microstructures having homogeneous packing structure.

EXAMPLE 3

One hundred and fifty grams (150 g) of the granules prepared in the same way as Example 1 were charged to an aluminum mold (inner diameter: 65 mm) and 35 ml of ethanol/water mixed solvent (water: ethanol=1:1) was added. While heating this to 40° C., the centrifugal casting was carried out at 1,500 rpm for 0.5 hour to make green body having a homogeneous packing structure without substantial particle separation.

Figure 6:
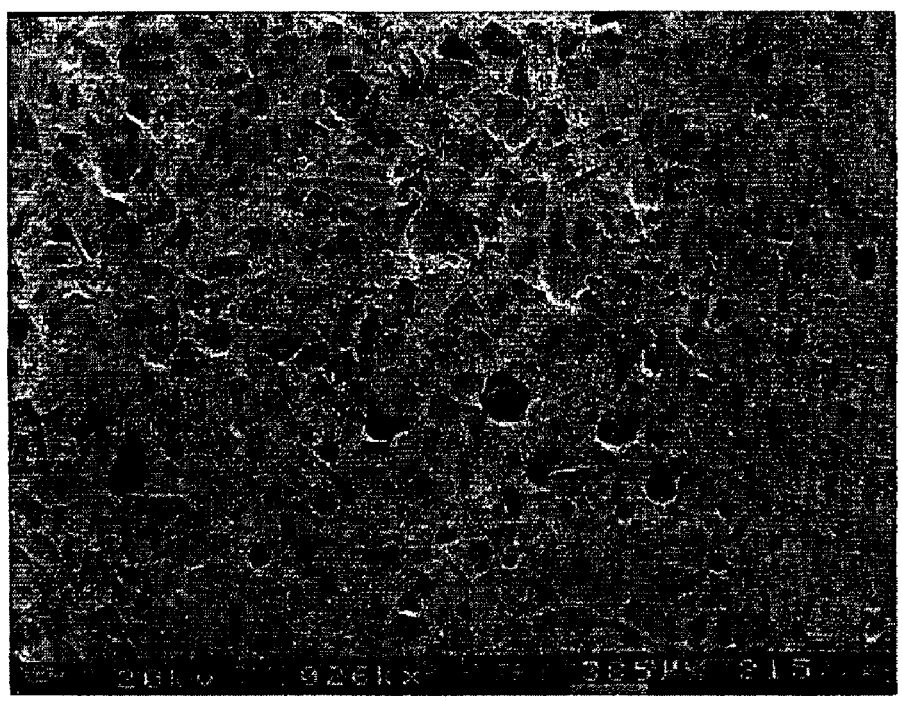
FIG. 6 is SEM photograph which shows a microstructure having a homogeneous packing structure of a green body prepared in Example 3.

Subsequently, the identical process as in Example 1 was utilized to produce the carbonized body. As illustrated in FIG. 6, the carbonized green bodies prepared in this example displayed the microstructures having homogeneous packing structure.

EXAMPLE 4

For making alumina sintering vessels, to improve their creep resistance and thermal shock resistance, mixed multi-component powders comprised of coarse and fine powders were used to obtain sintering body with porosity of 25% or less. Likewise, when trying to make a tube-like part such as an adiabatic or corrosion resistant tube, centrifugal casting using the granules as prepared in this invention can be effective.

Calcined alumina powders with the average particle size of 50 micron (CA 50F, Korea Chemical Co., Ltd., Republic of Korea) were mixed with fine alumina powders with the average particle size of 0.4 micron (Japan Sumitomo, AES-11C) in the ratio of 63:37. 200 g of the prepared powders mixture were blended in the dry process for two hours with phenol resins (KNG 100, Kolon Chemical Co., Ltd., Republic of Korea) of 5 wt % of the mixed powders. 40 ml of 1-ethylalcohol as solvent was added to the dry mixture and agitated at room temperature for 30 minutes until phenol resins were completely dissolved.

The mixed slurry was dropped in an aqueous solution of hexamethyleneamine at 70° C. and agitated vigorously for 10 minutes. This mixture is cooled down to room temperature, and then washing with water and filtration were repeated three times. The filtered granules were dried at not more than 80° C. to be used for centrifugal casting.

One hundred and fifty grams (150 g) of the prepared granules were charged to an aluminum mold (inner diameter: 65 mm) and 70 ml of water was added. While heating this to 80° C., the centrifugal casting was carried out at 1,500 rpm for 1 hour to make green body having a homogeneous packing structure without substantial particle separation.

Next, the prepared green bodies were dried and hardened at 80° C. for 10 hours. In order to remove organics in the thermosetting phenol resins, the temperature was increased at 2° C./min and the bodies were kept at 600° C. for 1 hour. Thereafter, the temperature was increased at 5° C./min and the bodies were kept at 1600° C. for 2 hours. The bodies were then cooled down at 5° C./min to make a sintering body of alumina tube. In this case, the obtained alumina part also displayed excellent packing structure having a homogeneous distribution of the calcined alumina particles.

EXAMPLE 5

One hundred and fifty grams (150 g) of the granules prepared in the same way as Example 4 were charged to an aluminum mold (inner diameter: 65 mm) and 20 ml of ethanol was added. While heating this to 50° C., the centrifugal casting was carried out at 1,500 rpm for 0.5 hour to make green body having a homogeneous packing structure without substantial particle separation.

Subsequently, the identical process as in Example 4 was utilized to produce a sintering body. In this case, the obtained alumina part also displayed excellent packing structure having a homogeneous distribution of the calcined alumina particles.

EXAMPLE 6

One hundred and fifty grams (150 g) of the granules prepared in the same way as Example 4 were charged to an aluminum mold (inner diameter: 65 mm) and 30 ml of ethanol/water mixed solvent (water: ethanol=1:3) was added. While heating this to 50° C., the centrifugal casting was carried out at 1,500 rpm for 0.5 hour to make green body having a homogeneous packing structure without substantial particle separation.

Subsequently, the identical process as in Example 4 was utilized to produce a sintering body. In this case, the obtained alumina part also displayed excellent packing structure having a homogeneous distribution of the calcined alumina particles.

The wet process, which is normally used to manufacture the ceramics parts with complex shapes and homogeneous microstructures, has limitations when raw material powders have a wide range of size and density distributions, which tend to promote particle separation. With the present invention, such problems are overcome. When tube-shaped parts such as a reaction tube are desired, the invention especially provides excellent quality for centrifugal casting. Further, by controlling the solubility of phenol resins, this invention completely prevents separation of the resins. The present invention provides a solution to packing defects resulting from particle separation and also prevents those defects resulting from sintering processes.

What is claimed is:

1. A method of making homogeneous granules such as powders of multimodal particle size distribution and phenol resin, comprising the steps of:
   (1) providing a homogeneous mixture including powders of multimodal particle size distribution, phenol resin and alcohol;
   (2) dropping said mixture from step (1) in water or water including hardener and agitating it to form homogeneous granules;
   (3) separating the granules from the mixture in step (2) by filtration or precipitation which are then washed with water to remove residual alcohol; and
   (4) drying the granules separated in step (3) to remove any liquid medium present in the granules.

2. The method according to claim 1, wherein the amount of phenol resins is about 1 to 20% by weight of raw material powders.

3. The method according to claim 1, wherein the temperature of water in step (2) is about 70 to 90° C.

4. A method for making green bodies having a homogeneous packing structure without particle separation, comprising the steps of:
   (1) charging the granules prepared according to claim 1 to a mold and adding water, alcohol or water/alcohol mixed solvent of about 20 to 100% by volume of pores formed by the granules; and
   (2) heating the mixture in the mold while applying centrifugal force of about 2 to 100 times gravitational acceleration.

5. The method according to claim 4, wherein the solvent is water.

6. The method according to claim 5, wherein the mixture is heated to about 80 to 110° C. while applying centrifugal force of about 10 to 100 times gravitational acceleration.

7. The method according to claim 4, wherein the solvent is either alcohol or water-alcohol mixed solvent.

8. The method according to claim 7, wherein the mixture is heated to about 40 to 80° C. while applying centrifugal force of about 2 to 10 times gravitational acceleration.

9. The method according to claim 4, further comprising the steps of:
   (3) maintaining the prepared green bodies at about 50 to 80° C. for about 2 to 10 hours depending on the thickness of green bodies to completely harden phenol resins; and
   (4) removing pockets of phenol resin in green bodies in inert gas atmosphere or under vacuum, whereby residual carbon is left.

10. The method according to claim 4, further comprising the steps of:
   (3) maintaining the prepared green bodies at about 50 to 80° C. for about 2 to 10 hours depending on the thickness of green bodies to completely harden phenol resins; and
   (4) removing pockets of phenol resin in green bodies in air to eliminate residual carbon.

* * * * *